US00RE38050E

(19) United States
(12) Reissued Patent
Hachiya et al.

(10) Patent Number: US RE38,050 E
(45) Date of Reissued Patent: Mar. 25, 2003

(54) POLYCARBONATE COMPRISING DIFFERENT KINDS OF BONDING UNITS AND PROCESS FOR THE PREPARATION THEREOF

(75) Inventors: Hiroshi Hachiya, Kurashiki (JP); Kyosuke Komiya, Kurashiki (JP); Miyuki Kazunori, Kurashiki (JP)

(73) Assignee: Asahi Kasei Kabushiki Kaisha, Osaka (JP)

(21) Appl. No.: 09/920,724

(22) PCT Filed: Mar. 5, 1997

(86) PCT No.: PCT/JP97/00685

§ 371 (c)(1), (2), (4) Date: Oct. 15, 1997

(87) PCT Pub. No.: WO97/32916

PCT Pub. Date: Sep. 12, 1997

Related U.S. Patent Documents

Reissue of:
(64) Patent No.: 5,932,683
Issued: Aug. 3, 1999
Appl. No.: 08/930,191
Filed: Oct. 15, 1997

(30) Foreign Application Priority Data

Mar. 5, 1996 (JP) ..... 8-073139

(51) Int. Cl.[7] ..... C08G 64/00
(52) U.S. Cl. ..... 528/196; 528/198
(58) Field of Search ..... 528/196, 198

(56) References Cited

U.S. PATENT DOCUMENTS 4,562,242 A * 12/1985 Mark et al. ..... 528/193
5,418,316 A * 5/1995 Kuhling et al. ..... 528/199
5,468,836 A * 11/1995 Okano et al. ..... 528/204

FOREIGN PATENT DOCUMENTS

JP 5271400 * 10/1993
JP 0718069 * 11/1995

* cited by examiner

*Primary Examiner*—Terressa M. Boykin
(74) *Attorney, Agent, or Firm*—Birch, Stewart, Kolasch & Birch, LLP

(57) ABSTRACT

Disclosed is a polycarbonate comprising a plurality of aromatic polycarbonate main chains, wherein the aromatic polycarbonate main chains collectively contain specific heterounits in a specific amount in the polycarbonate main chains. The polycarbonate of the present invention can be obtained by controlling the temperature of and the residence time of the polymerizable material in the reaction zones of the reaction system so as to satisfy the specific requirements. The polycarbonate of the present invention is advantageous in that not only does it have high transparency and colorlessness as well as high mechanical strength, but also it can exhibit high non-Newtonian flow properties, so that it exhibits high molding melt fluidity. Therefore, the polycarbonate of the present invention is extremely advantageous from a commercial point of view.

7 Claims, 1 Drawing Sheet

POLYCARBONATE COMPRISING DIFFERENT KINDS OF BONDING UNITS AND PROCESS FOR THE PREPARATION THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a polycarbonate having heterounits and a method for producing the same. More particularly, the present invention is concerned with a polycarbonate comprising a plurality of aromatic polycarbonate main chains, wherein the aromatic polycarbonate main chains collectively contain specific heterounits in a specific amount in the polycarbonate main chains, and a method for producing the same. The polycarbonate of the present invention is advantageous in that not only does it have high transparency and colorlessness as well as high mechanical strength, but also it can exhibit high non-Newtonian flow properties, so that it exhibits high molding melt fluidity. Therefore, the polycarbonate of the present invention is extremely advantageous from a commercial point of view.

2. Prior Art

Polycarbonates have been widely used in various fields as engineering plastics having excellent heat resistance, impact resistance and transparency. Production of polycarbonates has conventionally been conducted by using the phosgene process. However, polycarbonates produced by using the phosgene process have problems in that the production thereof needs the use of phosgene, which is poisonous, and that they contain residual methylene chloride (solvent), which not only adversely affects the thermal stability of the polycarbonates, but also causes corrosion of a mold used for the molding of the polycarbonates. Therefore, recently, polycarbonates produced by using the transesterification process have been drawing attention.

With respect to transesterification polycarbonates, it is known: that almost colorless, transparent transesterification can be obtained on a laboratory scale; however, when the production of transesterification polycarbonates is conducted on a commercial scale, only those having slightly yellowish color can be obtained [see "Purasuchikku Zairyo Koza (5), Porikaboneto Jushi (Lecture on Plastic Materials (5), Polycarbonate Resins)", page 66, published in 1981 by The Nikkan Kogyo Shimbun Ltd., Japan], and that transesterification polycarbonates have disadvantages in that they have many branched structures, so that they have poor strength (danger of brittle fracture is high), as compared to phosgene process polycarbonates [see "Kobunshi (Polymer)", vol. 27, p. 521, July 1978)].

In order to alleviate these problems of the transesterification polycarbonates, various studies have been made on the structure and production process of the transesterification polycarbonates. With respect to the branched structures of the transesterification polycarbonates, it is known that such branched structures are formed as follows. During the progress of the polymerization reaction in the presence of an alkali in the reaction system, the polycarbonate chain being formed suffers a side reaction represented by the reaction formula described below, which is similar to the Kolbe-Schmitt reaction:

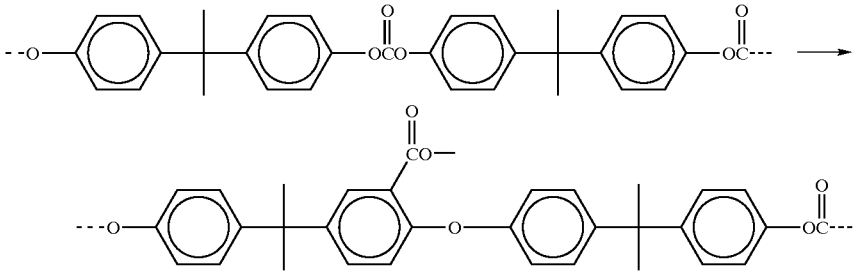

As is apparent from the above-shown structure formed in the main chain by the side reaction, a branched chain grows and extends through ester bonds. In some cases, such a branched chain forms a crosslinked structure in the final polycarbonate [see "Purasuchikku Zairyo Koza (5), Porikaboneto Jushi (Lecture on Plastic Materials (5), Polycarbonate Resins)", page 64, published in 1981 by The Nikkan Kogyo Shimbun Ltd., Japan; and "Porikaboneto Jushi Hando Bukku (Polycarbonate Resin Hand Book)", page 49, published in 1992 by The Nikkan Kogyo Shimbun Ltd., Japan].

With respect to the structure of the transesterification polycarbonate, it has been attempted to reduce the amount of branched structure in the polycarbonate. For example, Unexamined Japanese Patent Application Laid-Open Specification No. 5-105751 and Unexamined Japanese Patent Application Laid-Open Specification No. 5-202180 (corresponding to U.S. Pat. No. 5,468,836) disclose a technique to obtain a transesterification polycarbonate having no or an extremely small amount of branched structure. Specifically, in these prior art documents, the transesterification reaction is conducted using a specific combination of catalysts, to thereby obtain a colorless, transparent polycarbonate having no or an extremely small amount of branched structure which is formed by the side reaction during the polymerization. Unexamined Japanese Patent Application Laid-Open Specification No. 7-18069 (corresponding to U.S. Pat. No. 5,418,316) proposes a method for producing a polycarbonate, in which, by the use of a specific catalyst, the amount of the above-mentioned branched structure formed by the side reaction similar to the Kolbe-Schmitt reaction is suppressed to a level as low as 300 ppm or less. The polycarbonates disclosed in these prior art documents have high transparency and colorlessness; however, these polycarbonates have problems in that they exhibit poor non-Newtonian flow properties, so that they disadvantageously exhibit low molding melt fluidity.

For solving the above problems, for example, Unexamined Japanese Patent Application Laid-Open Specification Nos. 5-271400 and 5-295101 (each corresponding to U.S. Pat. No. 5,468,836) disclose a transesterification technique in which the formation of the above-mentioned disadvantageous branched structure resulting from the side reaction of the above reaction formula is reduced by the use of a specific catalyst to thereby achieve an improvement in transparency and colorlessness of the formed polycarbonate, whereas the non-Newtonian flow properties of the polycarbonate are improved by intentionally introducing another specific branched structure to the polycarbonate by the use of a multifunctional compound, to thereby improve the properties of the polycarbonate so that it can be advantageously used for blow molding. Further, in U.S. Pat. No. 4,562,242, it is attempted to improve the molding melt fluidity of the polycarbonate by the use of a 5-(dimethyl-p-hydroxybenzyl) salicylic acid as a branching agent. However, the use of the multifunctional compounds as mentioned above has problems in that these compounds promote a crosslinking reaction during the polymerization, so that the final polycarbonate is likely to contain gel.

Therefore, it has been desired to develop a transesterification technique, in which the occurrence of branching of the polycarbonate structure can be controlled without using a multifunctional compound which is likely to cause gelation, so as to produce a polycarbonate which not only has high transparency and colorlessness as well as high mechanical strength, but also exhibits high non-Newtonian flow properties, so that the polycarbonate can exhibit high molding melt fluidity, as compared to the phosgene process polycarbonates.

Further, with respect to the process for producing a transesterification polycarbonate, various improvements have been proposed. For example, with respect to a process in which use is made of a plurality of polymerizers which are connected in series, it has been proposed to use a special type of polymerizer as a final stage polymerizer, such as a special type of horizontal agitation type polymerizer (see Unexamined Japanese Patent Application Laid-Open Specification No. 2-153923) or a twin screw vented extruder (see Examined Japanese Patent Application Publication No. 52-36159 and Unexamined Japanese Patent Application Laid-Open Specification No. 63-23926. However, the techniques of the above-mentioned prior art documents are only intended to promote the removal of phenol from the polymerization reaction system. Therefore, by these techniques, a polycarbonate having a high molecular weight can be easily obtained; however, the obtained polycarbonate is not satisfactory with respect to the properties thereof, such as mechanical properties and molding melt fluidity.

The task of the present invention is to provide a polycarbonate which is advantageous in that not only does it have high transparency and colorlessness as well as high mechanical strength, but also it exhibits high non-Newtonian flow properties, so that it can exhibit high molding melt fluidity.

SUMMARY OF THE INVENTION

In this situation, the present inventors have made extensive and intensive studies with a view toward solving the above-mentioned problems accompanying the conventional polycarbonates. As a result, it has been found that a polycarbonate comprising a plurality of aromatic polycarbonate main chains, wherein the aromatic polycarbonate main chains collectively contain specific heterounits in a specific amount in the polycarbonate chains, is free from the above-mentioned problems accompanying the conventional polycarbonates, and is advantageous in that not only does it have high transparency and colorlessness as well as high mechanical strength, but also it exhibits high non-Newtonian flow properties, so that it can exhibit high molding melt fluidity.

Accordingly, it is an object of the present invention to provide a polycarbonate which is advantageous in that not only does it have high transparency and colorlessness as well as high mechanical strength, but also it exhibits high non-Newtonian flow properties, so that it can exhibit high molding melt fluidity.

It is another object of the present invention to provide a method for producing the above-mentioned excellent polycarbonate.

The foregoing and other objects, features and advantages of the present invention will be apparent from the following detailed description and appended claims taken in connection with the accompanying drawing.

DESCRIPTION OF REFERENCE NUMERALS (FIG. 1)

Figure 1:
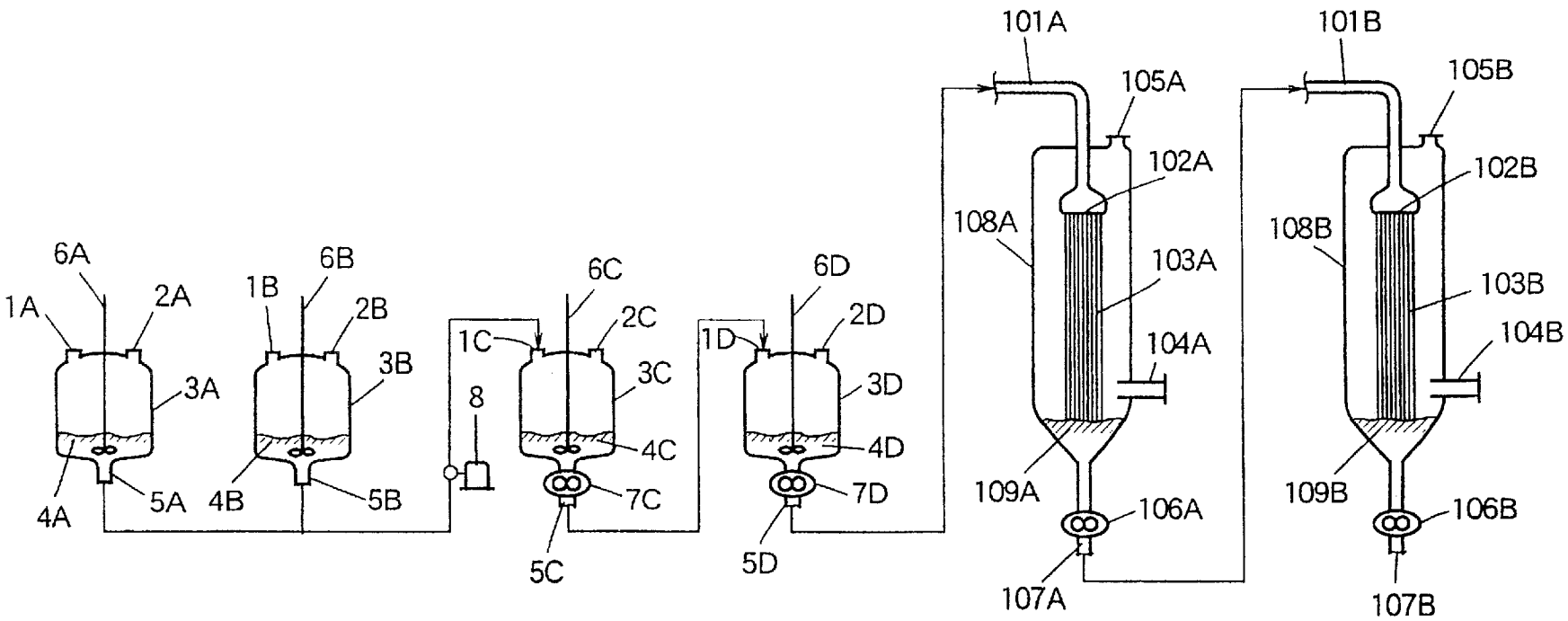
FIG. 1 is a diagram showing the system employed for producing a polycarbonate in Example 1.

1A–6A: Numerals assigned in connection with first vertical agitation type polymerizer vessel (A)
1B–6B: Numerals assigned in connection with first vertical agitation type polymerizer vessel (B)
1C–7C: Numerals assigned in connection with second vertical agitation type polymerizer vessel (C)
1D–7D: Numerals assigned in connection with third vertical agitation type polymerizer vessel (D)
101A–109A: Numerals assigned in connection with first wire-wetting fall polymerizer
101B–109B: Numerals assigned in connection with second wire-wetting fall polymerizer
1A, 1B: Inlet for a starting polymerizable material
1C, 1D: Inlet for a prepolymer
2A, 2B, 2C, 2D: Vent
3A, 3B: First vertical agitation type polymerizer vessels (A) and (B)
3C: Second vertical agitation type polymerizer vessel (C)
3D: Third vertical agitation type polymerizer vessel (D)
4A, 4B, 4C, 4D: Molten prepolymer
5A, 5B, 5C, 5D: Outlet
6A, 6B, 6C, 6D: Agitator
7C, 7D, 8: Transfer pump
101A, 101B: Inlet for a prepolymer
102A, 102B: Perforated plate
103A, 103B: Wire
104A, 104B: Gas feed port
105A, 105B: Vent
106A: Transfer pump
106B: Discharge pump
107A, 107B: Outlet
108A, 108B: Main body of wire-wetting fall polymerizer
109A: Molten Prepolymer
109B: Molten Polymer

DETAILED DESCRIPTION OF THE INVENTION

According to the present invention, there is provided a polycarbonate comprising a plurality of aromatic polycarbonate main chains, each comprising recurring units each independently represented by the following formula (1):

(1)

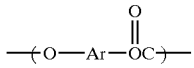

wherein Ar represents a divalent $C_5$–$C_{200}$ aromatic group, wherein the plurality of aromatic polycarbonate main chains collectively contain at least one heterounit (A) and at least one heterounit (B) in the polycarbonate main chains, the heterounit (A) being represented by a formula selected from the following group (2) of formulae:

(2)

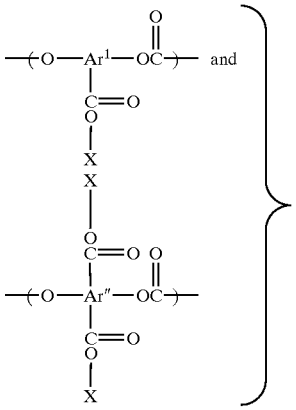

wherein Ar' represents a trivalent $C_5$–$C_{200}$ aromatic group, Ar" represents a tetravalent $C_5$–$C_{200}$ aromatic group, and X represents a polycarbonate chain having recurring units each represented by the formula

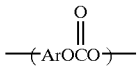

wherein Ar is as defined above and having a weight average molecular weight of from 214 to 100,000, and wherein, when the polycarbonate main chains contain a plurality of heterounits (A), the heterounits (A) are the same or different, the heterounit (B) being represented by a formula selected from the following group (3) of formulae:

(3)

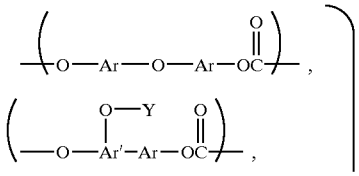

-continued

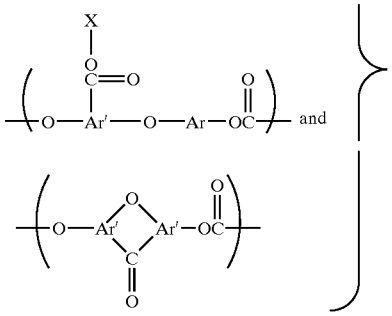

wherein Ar, Ar' and X are as defined above and Y represents a polycarbonate chain having recurring units each represented by the formula

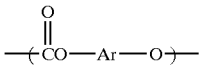

wherein Ar is as defined above and having a weight average molecular weight of from 214 to 100,000, and wherein, when the polycarbonate main chains contain a plurality of heterounits (B), the heterounits (B) are the same or different, the sum of the amounts of the heterounit (A) and the heterounit (B) being from 0.01 to 0.3 mole %, based on the molar amount of the recurring units (1), wherein each of X and Y optionally contains at least one heterounit selected from the group consisting of heterounits (A) and (B), the polycarbonate having a weight average molecular weight of from 5,000 to 300,000.

For easy understanding of the present invention, the essential features and various embodiments of the present invention are enumerated below.

1. A polycarbonate comprising a plurality of aromatic polycarbonate main chains, each comprising recurring units each independently represented by the following formula (1):

(1)

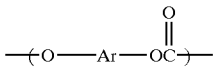

wherein Ar represents a divalent $C_5$–$C_{200}$ aromatic group, wherein the plurality of aromatic polycarbonate main chains collectively contain at least one heterounit (A) and at least one heterounit (B) in the polycarbonate main chains, the heterounit (A) being represented by a formula selected from the following group (2) of formulae:

(2)

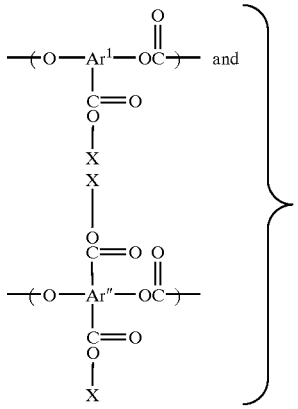

wherein Ar' represents a trivalent $C_5$–$C_{200}$ aromatic group, Ar" represents a tetravalent $C_5$–$C_{200}$ aromatic group, and X represents a polycarbonate chain having recurring units each represented by the formula

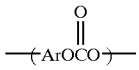

wherein Ar is as defined above and having a weight average molecular weight of from 214 to 100,000, and wherein, when the polycarbonate main chains contain a plurality of heterounits (A), the heterounits (A) are the same or different, the heterounit (B) being represented by a formula selected from the following group (3) of formulae:

(3)

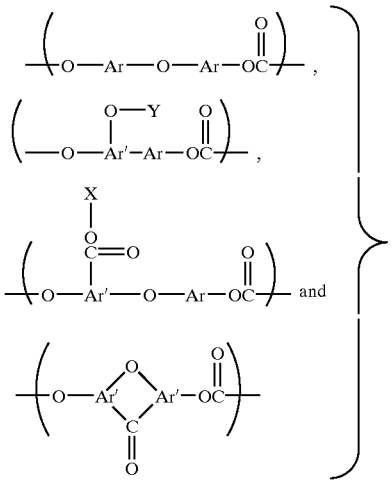

wherein Ar, Ar' and X are as defined above and Y represents a polycarbonate chain having recurring units each represented by the formula

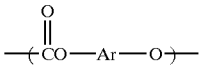

and having a weight average molecular weight of from 214 to 100,000, and wherein, when the polycarbonate main chains contain a plurality of heterounits (B), the heterounits (B) are the same or different, the sum of the amounts of the heterounit (A) and the heterounit (B) being from 0.01 to 0.3 mole %, based on the molar amount of the recurring units (1), wherein each of X and Y optionally contains at least one heterounit selected from the group consisting of heterounits (A) and (B), the polycarbonate having a weight average molecular weight of from 5,000 to 300,000.

2. The polycarbonate according to item 1 above, wherein 85% or more of the recurring units (1) are each represented by the following formula (1'):

(I')

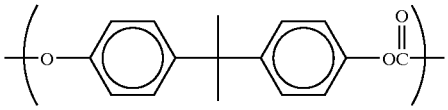

3. The polycarbonate according to item 1 above, wherein:

the recurring units (1) are each represented by the following formula (1'):

(I')

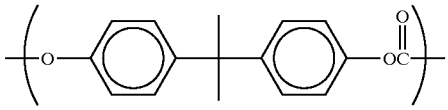

the heterounit (A) is represented by a formula selected from the following group (2') of formulae:

(2')

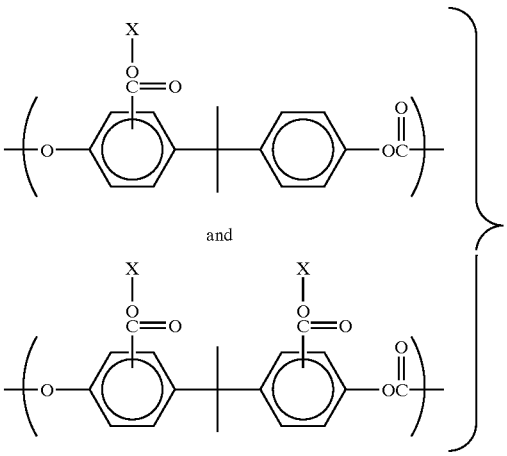

wherein X is as defined for formula (2), and the heterounit (B) is represented by a formula selected from the following group (3') of formulae:

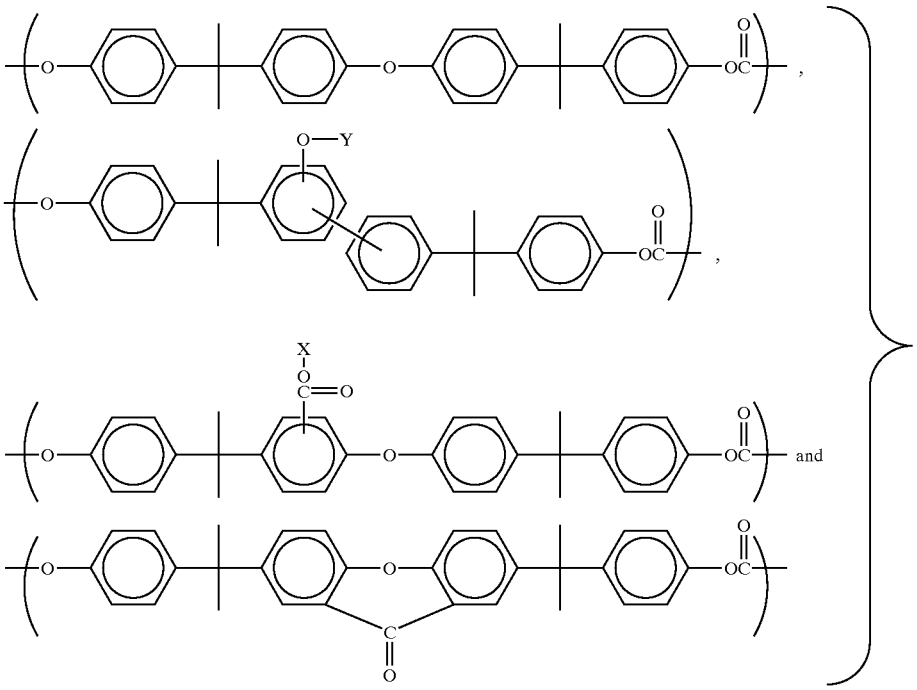

wherein X is as defined for formula (2), and Y is as defined for formula (3).

4. The polycarbonate according to any one of items 1 to 3 above, wherein the heterounit (B) is present in an amount of from 0.1 to 30 mole %, based on the molar amount of the heterounit (A).

5. The polycarbonate according to any one of items 1 to 4 above, which is produced from an aromatic dihydroxy compound and a carbonic diester by transesterification.

6. In a method for producing a polycarbonate which comprises subjecting to a stepwise transesterification reaction, in a plurality of reaction zones, at least one polymerizable material selected from the group consisting of:

a molten monomer mixture of an aromatic dihydroxy compound and a carbonic diester, and a molten prepolymer obtained by a process comprising reacting an aromatic dihydroxy compound with a carbonic diester, the aromatic dihydroxy compound being represented by the following formula:

$$HO—Ar—OH$$

wherein Ar represents a divalent $C_5$–$C_{200}$ aromatic group, the carbonic diester being represented by the following formula:

$$Ar^3—O\overset{\overset{\displaystyle O}{\|}}{C}O—Ar^4$$

wherein $Ar^3$ and $Ar^4$ are the same or different and each represent a monovalent $C_5$–$C_{200}$ aromatic group, the improvement in which the stepwise transesterification reaction of the polymerizable material is performed under reaction conditions which satisfy the following formula (4):

$$0.2 \leqq \sum_{i=1}^{n} (ki \times Ti \times Hi) \leqq 1.2 \quad (4)$$

wherein:

i represents the zone number assigned in an arbitrary order among n reaction zones of the reaction system, Ti represents the average temperature (°C.) of the polymerizable material in the i-th reaction zone, Hi represents the average residence time (hr) of the polymerizable material in the i-th reaction zone, ki represents a coefficient represented by the following formula (5):

$$ki=1/(a \times Ti^{-b}) \quad (5)$$

wherein Ti is as defined above, and a and b depend on Ti, and wherein:

when Ti satisfies the formula:

$$Ti<240° C.,$$

a is $1.60046 \times 10^5$ and b is 0.472, when Ti satisfies the formula:

$$240° C. \leqq Ti<260° C.,$$

a is $4 \times 10^{49}$ and b is 19.107, and when Ti satisfies the formula:

$$260° C. \leqq Ti,$$

a is $1\times10^{122}$ and b is 49.082.

7. A polycarbonate which is substantially the same product as produced by the method of item 6 above.

The polycarbonate of the present invention comprises a plurality of aromatic polycarbonate chains, each comprising recurring units each independently represented by the formula (1) above, wherein the aromatic polycarbonate chains collectively contain at least one heterounit (A) and at least one heterounit (B). The heterounit (A) is represented by a formula selected from the above-mentioned formulae of group (2). When the aromatic polycarbonate chains contain a plurality of the heterounits (A), the heterounits (A) may be the same or different. The heterounit (B) is represented by a formula selected from the above-mentioned formulae of group (3). When the aromatic polycarbonate chains contain a plurality of the heterounits (B), the heterounits (B) may be the same or different.

In the formula (1), the formulae of group (2) and the formulae of group (3), each Ar independently represents a divalent $C_5$–$C_{200}$ aromatic group, each Ar' independently represents a trivalent $C_5$–$C_{200}$ aromatic group which has a structure equivalent to a mono-substituted Ar, and each Ar" independently represents a tetravalent $C_5$–$C_{200}$ aromatic group which has a structure equivalent to a di-substituted Ar. Examples of divalent aromatic groups Ar include phenylene, naphthylene, biphenylene, pyridylene and a divalent aromatic group represented by the formula: —$Ar^1$—Q—$Ar^2$—, wherein each of $Ar^1$ and $Ar^2$ independently represents a divalent $C_5$–$C_{70}$ carbocyclic or heterocyclic aromatic group, and Q represents a divalent $C_1$–$C_{30}$ alkane group.

In the divalent aromatic groups $Ar^1$ and $Ar^2$, at least one hydrogen atom may be replaced by a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Specific examples of heterocyclic aromatic groups include an aromatic group having in a skeleton thereof at least one hetero atom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane groups Q include organic groups respectively represented by the following formulae:

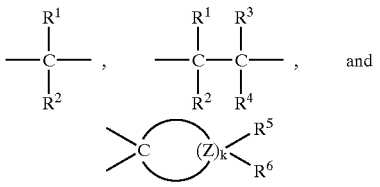

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms or a carbocyclic aralkyl group having from 6 to 10 ring-forming carbon atoms; k represents an integer of from 3 to 11; each Z represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms; and wherein at least one hydrogen atom of each of $R^1$, $R^2$, $R^3$, $R^4$, $R^5$ and $R^6$ may be independently replaced by a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Specific examples of divalent aromatic groups Ar include groups respectively represented by the following formulae:

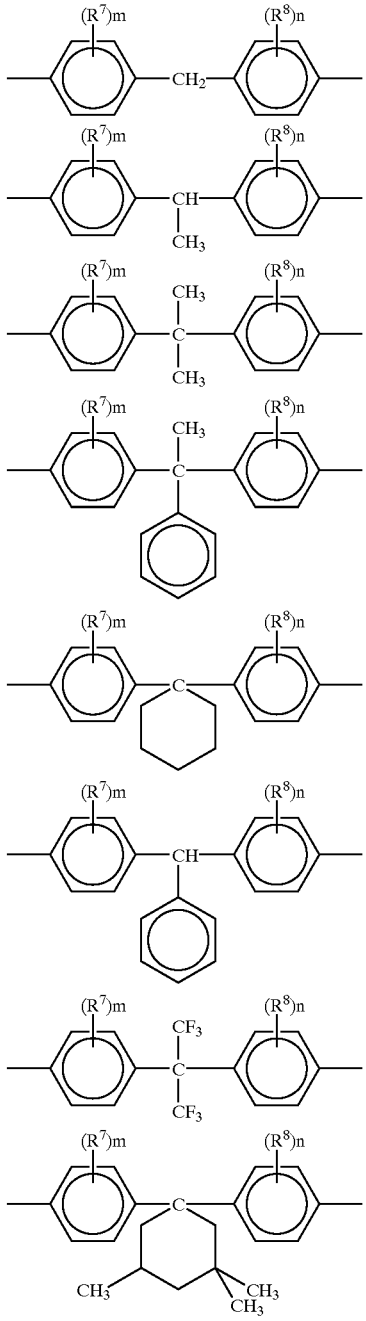

-continued

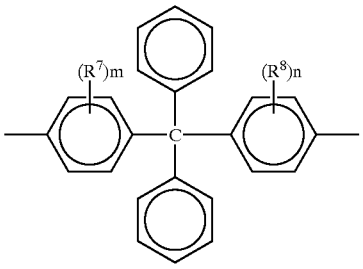

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or an phenyl group; each of m and n independently represents an integer of from 1 to 4, with the proviso that when m is an integer of from 2 to 4, the $R^7$ s are the same or different, and when n is an integer of from 2 to 4, the $R^8$'s are the same or different.

Further examples of divalent aromatic groups Ar include those which are represented by the following formula:

$$—Ar^1—Z'—Ar^2—$$

wherein $Ar^1$ and $Ar^2$ are as defined above; and Z' represents a single bond or a divalent group, such as —O—, —CO—, —S—, —$SO_2$, —SO—, —COO—, or —CON($R^1$)—, wherein $R^1$ is as defined above.

Examples of such divalent aromatic groups Ar include groups respectively represented by the following formulae: wherein $R^7$, $R^8$, m and n are as defined above.

In the present invention, these aromatic groups Ar may be used individually or in combination. As a preferred example of recurring units of the formula (1) in the polycarbonate of the present invention, there can be mentioned a unit represented by the above-mentioned formula (1'), which is derived from bisphenol A. It is preferred that 85 mole % or more of the recurring units (1) are the units of the formula (1').

With respect to the heterounit (A), it is preferred that the heterounit (A) is one which is represented by a formula selected from the formulae of the following group (2') of formulae:

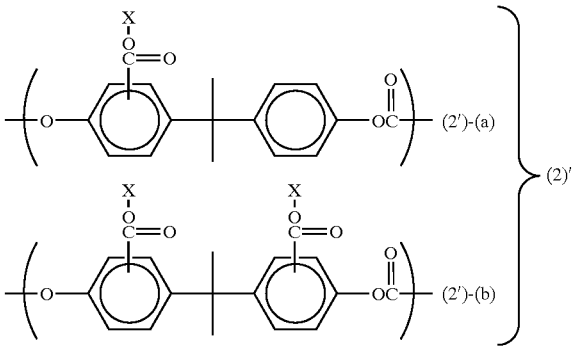

wherein X is as defined for formula (2).

In the polycarbonate of the present invention, it is necessary that the aromatic polycarbonate chains collectively contain at least one heterounit (A).

With respect to the heterounit (B), it is preferred that the heterounit (B) is one which is represented by a formula selected from the following group (3') of formulae:

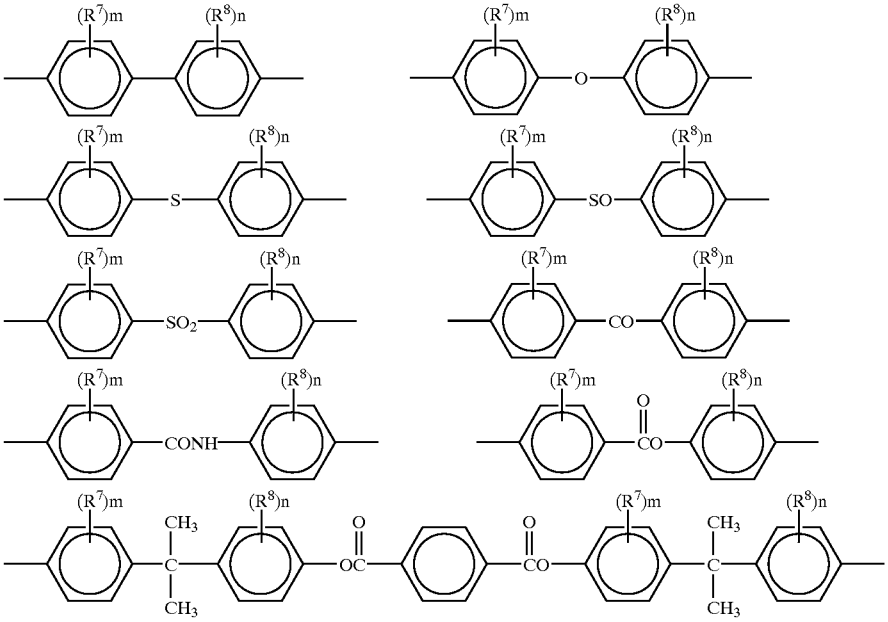

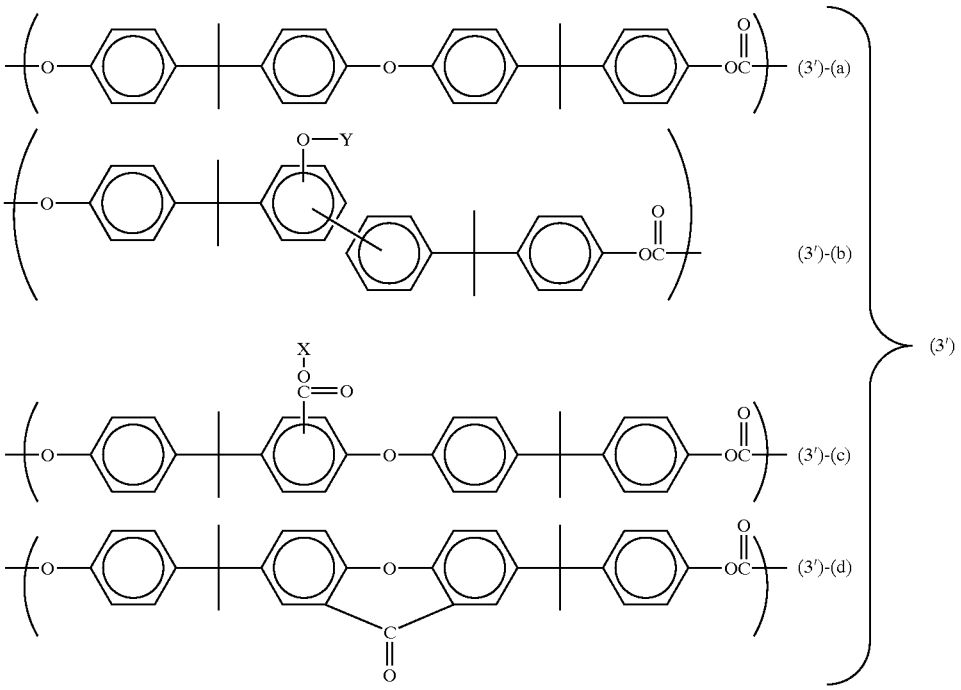

wherein X is as defined for formula (2), and

Y is as defined for formula (3).

In the polycarbonate of the present invention, it is necessary that the aromatic polycarbonate chains collectively contain at least one heterounit (B).

In the polycarbonate of the present invention, it is necessary that the sum of the amounts of the heterounit (A) and the heterounit (B) be in the range of from 0.01 to 0.3 mole %, based on the molar amount of the recurring units (1).

When the sum of the amounts of the heterounit (A) and the heterounit (B) is less than 0.01 mole %, the non-Newtonian flow properties of the polycarbonate lowers, so that the molding melt fluidity, (i.e., the fluidity of the polycarbonate at a high shear rate) is caused to lower. When the sum of the amounts of the heterounit (A) and the heterounit (B) is more than 0.3 mole %, the mechanical properties (such as tensile elongation and Izod impact strength) of the polycarbonate lower.

In the present invention, the sum of the heterounit (A) and the heterounit (B) is preferably in the range of from 0.02 to 0.25 mole %, more preferably from 0.03 to 0.2 mole %, based on the molar amount of the recurring units (1). In the present invention, for achieving a good balance of the molding melt fluidity and the mechanical strength, it is preferred that the polycarbonate contains the heterounit (B) in an amount of from 0.1 to 30 mole %, more preferably from 0.1 to 10 mole %, based on the molar amount of the heterounit (A).

In the present invention, the determination of each of the recurring units (1), and the heterounits (A) and (B) can be conducted, for example, by a method in which the polycarbonate is completely hydrolyzed, and the resultant hydrolysis mixture is analyzed by reversed phase liquid chromatography (the analysis by reversed phase liquid chromatography can be conducted under the conditions as described below in the Examples). With respect to the hydrolysis of the polycarbonate, it is preferred that the hydrolysis be conducted at room temperature by the method described in Polymer Degradation and Stability 45 (1994), 127–137. The hydrolysis by this method is advantageous in that the complete hydrolysis of a polycarbonate can be achieved by simple operation, wherein it is free from the danger of occurrence of side reactions during the hydrolysis.

The polycarbonate of the present invention has a weight average molecular weight of from 5,000 to 300,000. When the weight average molecular weight is lower than 5,000, the mechanical strength of the polycarbonate lowers. When the weight average molecular weight is higher than 300,000, the molding melt fluidity of the polycarbonate lowers. In the present invention, the weight average molecular weight of the polycarbonate is preferably from 7,000 to 100,000, more preferably from 10,000 to 80,000.

In the present invention, the terminal structure of the polycarbonate is not particularity limited. The terminal group of the polycarbonate may be at least one group selected from a hydroxyl group, an aryl carbonate group and an alkyl carbonate group. The above-mentioned terminal hydroxyl group is derived from the aromatic dihydroxy compound used in the polymerizable material.

The terminal aryl carbonate group is represented by the following formula:

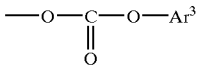

wherein $Ar^3$ represents an unsubstituted or substituted monovalent $C_6$–$C_{30}$ aromatic group.

Specific examples of terminal aryl carbonate groups include groups respectively represented by the following formulae:

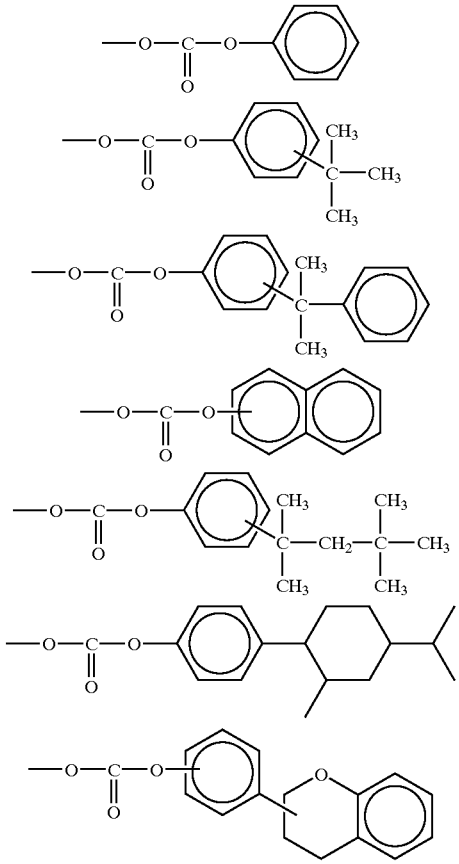

The terminal alkyl carbonate group is represented by the following formula:

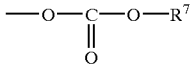

wherein $R^7$ represents a straight chain or branched alkyl group having 1 to 20 carbon atoms.

Specific examples of terminal alkyl carbonate groups include groups respectively represented by the following formulae:

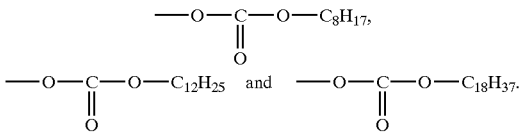

Among these terminal groups, a phenyl carbonate group, a p-t-butylphenyl carbonate group and a p-cumylphenyl carbonate group are preferred. With respect to the molar ratio of the terminal hydroxyl group to other terminal groups, there is no particular limitation. However, the molar ratio is generally selected in the range of from 0:100 to 100:0 depending on the use. From the viewpoint of improving heat resistance and hot water resistance, it is preferred that the amount of the terminal hydroxy group be as small as possible.

Hereinbelow, the method of the present invention for producing a polycarbonate is explained.

The method of the present invention comprises subjecting to a stepwise transesterification reaction, in a plurality of reaction zones, at least one polymerizable material selected from the group consisting of:

a molten monomer mixture of an aromatic dihydroxy compound and a carbonic diester, and a molten prepolymer obtained by a process comprising reacting an aromatic dihydroxy compound with a carbonic diester, the aromatic dihydroxy compound being represented by the following formula:

wherein Ar represents a divalent $C_5$–$C_{200}$ aromatic group, the carbonic diester being represented by the following formula:

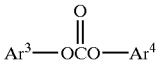

wherein $Ar^3$ and $Ar^4$ are the same or different and each represent a monovalent $C_5$–$C_{200}$ aromatic group, wherein the stepwise transesterification reaction of the polymerizable material is performed under reaction conditions which satisfy the following formula (4):

$$0.2 \leqq \sum_{i=1}^{n} (ki \times Ti \times Hi) \leqq 1.2 \quad (4)$$

wherein:

i represents the zone number assigned in an arbitrary order among n reaction zones of the reaction system, Ti represents the average temperature (° C.) of the polymerizable material in the i-th reaction zone, Hi represents the average residence time (hr) of the polymerizable material in the i-th reaction zone, ki represents a coefficient represented by the following formula (5):

$$ki=1/(a \times Ti^{-b}) \quad (5)$$

wherein Ti is as defined above, and a and b depend on Ti, and wherein:

when Ti satisfies the formula:

$$Ti<240° C.,$$

a is $1.60046 \times 10^5$ and b is 0.472, when Ti satisfies the formula:

$$240° C. \leqq Ti<260° C.,$$

a is $4 \times 10^{49}$ and b is 19.107, and when Ti satisfies the formula:

$$260° C. \leqq Ti,$$

a is $1 \times 10^{122}$ and b is 49.082.

In the present invention, the term "aromatic dihydroxy compound" means a compound represented by the formula:

HO—Ar—OH wherein Ar is as defined above. In the present invention, the aromatic dihydroxy compound may be a single type of aromatic dihydroxy compound or a combination of 2 or more types of aromatic dihydroxy compounds. It is preferred to use an aromatic dihydroxy compound in which the contents of a chlorine atom, an alkali metal and an alkaline earth metal are low. It is more preferred to use an aromatic dihydroxy compound substantially free from a chlorine atom, an alkali metal and an alkaline earth metal.

The carbonic diester used in the present invention is represented by the following formula:

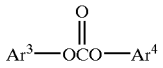

wherein $Ar^3$ and $Ar^4$ are the same or different and each represent a monovalent $C_5$–$C_{200}$ aromatic group.

In each of $Ar^3$ and $Ar^4$, which independently represents a monovalent carbocyclic or heterocyclic aromatic group, at least one hydrogen atom may be replaced by a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ may be the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups as $Ar^3$ and $Ar^4$ include those which are respectively represented by the following formulae:

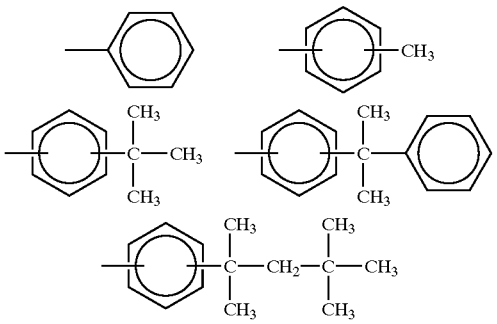

Representative examples of carbonic diesters include di(unsubstituted or substituted)phenyl carbonate compounds represented by the following formula:

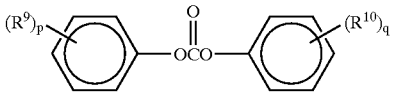

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of from 2 or more, the $R^{10}$'s are the same or different.

Of these diphenyl carbonate compounds, preferred are those having a symmetrical configuration, for example di(unsubstituted)phenyl carbonate and di(lower alkyl-substituted)phenyl carbonates, e.g., ditolyl carbonate and di-t-butylphenyl carbonate. Particularly preferred is diphenyl carbonate which has the simplest structure.

These carbonic diesters may be used individually or in combination. It is preferred that these carbonic diesters have a low content of a chlorine atom, an alkali metal or an alkaline earth metal. It is most preferred that these carbonic diesters are substantially free from a chlorine atom, an alkali metal and an alkaline earth metal.

The ratio in which the aromatic dihydroxy compound and the carbonic diester are used (i.e., a charging ratio) may be varied depending on the types of the aromatic dihydroxy compound and carbonic diester employed, the polymerization temperature and other polymerization conditions, and the desired molecular weight of a polycarbonate to be obtained and the desired proportions of the terminal groups in the polycarbonate. The carbonic diester is generally used in an amount of from 0.9 to 2.5 moles, preferably from 0.95 to 2.0 moles, more preferably from 0.98 to 1.5 moles, per mole of the aromatic dihydroxy compound.

In the present invention, the heterounit (A) and the heterounit (B) are formed during the polymerization reaction, so that the final polycarbonate contains the heterounit (A) and the heterounit (B).

In the present invention, for the purpose of introducing a branched structure to the polycarbonate, an aromatic poly(tri or more)hydroxy compound may be used in a small amount in the production of the polycarbonate, as long as the polycarbonate satisfying the above-mentioned requirements of the present invention can be obtained. Also, an aromatic monohydroxy compound or an aliphatic alcohol may be used for changing the terminal groups, or adjusting the molecular weight of the polycarbonate.

In the present invention, the production of a polycarbonate is conducted by a transesterification process which is a process wherein a condensation polymerization of the polymerizable material is performed by transesterification in the molten state or solid state while heating in the presence or absence of a catalyst under reduced pressure, under an inert gas flow or under both reduced pressure and an inert gas flow. The mode of the transesterification process, the polymerization equipment and the like are not specifically limited. For example, when a molten-state transesterification is employed, examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer having a perforated plate, and a wire-wetting fall polymerizer having a perforated plate and at least one wire provided in association with the perforated plate. These various types of reactors can be used individually or in combination. Further, for example, the transesterification reaction can also be performed by a method in which a molten-state transesterification is first conducted to obtain a prepolymer, and the obtained prepolymer is then subjected to a solid-state polymerization under reduced pressure, under an inert gas flow or under both reduced pressure and an inert gas flow, using a solid-state polymerizer.

With respect to materials for constructing these polymerizers used in the present invention, there is no particular limitation. However, stainless steel, nickel or glass is generally used as a material for at least inner wall portions of polymerizers.

With respect to the various types of reactors or polymerizers mentioned above, especially a free-fall polymerizer having a perforated plate and a wire-wetting fall polymerizer having a perforated plate and at least one wire, reference can be made, for example, to EP-0 738 743 A1.

In the method of the present invention, any of the above-mentioned transesterification reaction modes can be used as long as the transesterification is performed under the reaction conditions defined above.

The reaction temperature of the transesterification for producing a polycarbonate is generally in the range of from 50 to 350° C., preferably from 100 to 300° C. It is well known that when the reaction temperature is higher than the above-mentioned range, the produced polycarbonate is likely to suffer serious discoloration and tends to have poor thermal stability, and that when the reaction temperature is lower than the above-mentioned range, the polymerization proceeds so slowly that such a low temperature cannot be practically employed.

In the method of the present invention for producing a polycarbonate, as mentioned above, it is required that, in a stepwise transesterification reaction of a polymerizable material, the relationship between the temperature of and the residence time of the polymerizable material in the reaction zones of the reaction system be controlled so as to satisfy the following formula (4):

$$0.2 \leqq \sum_{i=1}^{n} (ki \times Ti \times Hi) \leqq 1.2 \quad (4)$$

wherein:

i represents the zone number assigned in an arbitrary order among n reaction zones of the reaction system, Ti represents the average temperature (° C.) of the polymerizable material in the i-th reaction zone, Hi represents the average residence time (hr) of the polymerizable material in the i-th reaction zone, ki represents a coefficient represented by the following formula (5):

$$ki=1/(a \times Ti^{-b}) \quad (5)$$

wherein Ti is as defined above, and a and b depend on Ti, and wherein:

when Ti satisfies the formula:

$$Ti<240° C.,$$

a is $1.60046 \times 10^5$ and b is 0.472, when Ti satisfies the formula:

$$240° C. \leqq Ti<260° C.,$$

a is $4 \times 10^{49}$ and b is 19.107, and when Ti satisfies the formula:

$$260° C. \leqq Ti,$$

a is $1 \times 10^{122}$ and b is 49.082.

When the value of $$\sum_{i=1}^{n}$$

(ki×Ti×Hi) in formula (4), which is determined by the relationship between the above-mentioned temperature and residence time, is greater than 1.2, the produced polycarbonate has a disadvantage in that the mechanical properties of the polycarbonate, such as elongation at break and Izod impact strength, become poor. When the value of $$\sum_{i=1}^{n}$$

(ki×Ti×Hi) is smaller than 0.2, the produced polycarbonate shows a disadvantage in that the molding melt fluidity of the polycarbonate is poor. The preferred range of the value of $$\sum_{i=1}^{n}$$

(ki×Ti×Hi) is from 0.3 to 1.0.

Generally, in a process for continuously producing a polycarbonate by transesterification reaction, the transesterification reaction of the polymerizable material is stepwise conducted in a plurality of reaction zones, wherein the reaction temperature, residence time and reaction pressure are stepwise changed over the plurality of reaction zones involved in the process. The value of $$\sum_{i=1}^{n}$$

(ki×Ti×Hi) in the formula (4) represents the sum of the values of (k×T×H) for all of the reaction zones. For example, when a continuous polymerization is performed by using a system in which a vessel for melting and mixing an aromatic dihydroxy compound and a carbonic diester, an agitation type reactor vessel, a centrifugal wiped film evaporation type reactor and a surface renewal type twin screw kneading reactor are serially connected through conduits, $$\sum_{i=1}^{n}$$

(ki×Ti×Hi) is the sum of (k×T×H in the melting and mixing vessel), (k×T×H in the conduit connecting the melting and mixing vessel to the agitation type reactor vessel), (k×T×H in the agitation type reaction vessel), (k×T×H in the conduit connecting the agitation type reactor vessel to the centrifugal wiped film evaporation type reactor), (k×T×H in the centrifugal wiped film evaporation type reactor), (k×T×H in the conduit connecting the centrifugal wiped film evaporation type reactor to the surface renewal type twin screw kneading reactor), (k×T×H in the surface renewal type twin screw kneading reactor) and (k×T×H in the conduit connecting the surface renewal type twin screw kneading reactor to a nozzle for withdrawal of the produced polymer), that is, the sum of values of (k×T×H) for all of the reaction zones including the conduits. The term "i-th reaction zone" means a reaction zone falling on the number i which is determined by the numbering system in which all reaction zones including conduits, such as a mixing vessel, a reactor or a conduit which connect these apparatuses, are assigned their respective numbers in the arbitrary order. When a heater is disposed on a conduit connecting two reactors to each other, the conduit segment between one of the reactors to the heater, the heater, and the conduit segment between the heater and the other reactor are each regarded as a reaction zone. The average temperature of the polymerizable material means the average temperature of the polymerizable material in the i-th reaction zone. When the polymerizable material in the i-th reaction zone has a temperature distribution wherein different portions have distinctly different temperatures, each of such different portions may be separately regarded as an i-th reaction zone. With respect to the measurement of the average temperature, various methods may be employed. For example, the average temperature can be obtained by averaging one or more temperatures measured by one or more thermometers disposed at a reactor or a conduit. When no thermometers are disposed at a reactor or a conduit, the temperature of a heating medium in a jacket may be used as the average temperature. Alternatively, the average temperature of the inlet and outlet of a jacket for circulating a heating medium, or the temperature which has been set for a heater or a heating medium may be employed as the average temperature of the polymerizable material in the i-th reaction zone. The average residence time is calculated by dividing the volume of the polymerizable material held in the i-th reaction zone by the volume of the polymerizable material passing through or withdrawn from the i-th reaction zone per unit time.

A suitable reaction pressure is selected depending on the molecular weight of the polycarbonate in the reaction system. When the number average molecular weight of the polycarbonate in the reaction system is less than 1,000, a reaction pressure in the range of from 50 mmHg to atmospheric pressure is generally employed. When the number average molecular weight of the polycarbonate in the reaction system is in the range of from 1,000 to 2,000, a reaction pressure in the range of from 3 mmHg to 80 mmHg is generally employed. When the number average molecular weight of the polycarbonate in the reaction system is more than 2,000, a reaction pressure of 10 mmHg or less, preferably 5 mmHg or less is generally employed.

A transesterification reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide; alkali metal salts of, alkaline earth metal salts of and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an arylene group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula: $(R^1 R^2 R^3 R^4)PB(R^1 R^2 R^3 R^4)$, wherein $R^1$ $R^2$ $R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts used is generally in the range of from $10^{-8}$ to 1% by weight, preferably from $10^{-7}$ to $10^{-1}$% by weight, based on the weight of the aromatic dihydroxy compound.

By virtue of the presence of a plurality of specific heterounits in a specific amount, the polycarbonate of the present invention is advantageous in that not only does it have high transparency and colorlessness as well as high mechanical strength, but also it exhibits high non-Newtonian flow properties, so that it exhibits high molding melt fluidity. Therefore, the polycarbonate of the present invention can be advantageously used in various application fields.

The polycarbonate of the present invention may contain additives depending on the use of the polycarbonate. Examples of additives include a thermal stabilizer, an antioxidant, a weathering stabilizer, a UV light absorber, a mold release agent, a lubricant, an antistatic agent, a plasticizer, a resin other than a polycarbonate or a polymer such as a rubber, a pigment, a dye, a filler, a reinforcing agent, and a flame retardant.

These additives may be mixed with the polycarbonate obtained in the molten state. Alternatively, the mixing of additives may be performed by a method in which the polycarbonate is first pelletized, the additives are mixed with the pelletized polycarbonate and the resultant mixture is again subjected to melt-kneading.

BEST MODE FOR CARRYING OUT THE INVENTION

The present invention will now be further illustrated in more detail with reference to the following Examples and Comparative Examples, which should not construed as limiting the scope of the present invention.

In the following Examples and Comparative Examples, various properties were measured and evaluated as follows.

(1) Measurement of the weight average molecular weight of a polycarbonate:

The weight average molecular weight of a polycarbonate was measured by gel permeation chromatography (GPC).

(2) Evaluation of the color of a polycarbonate:

The color of a polycarbonate was evaluated, using a test specimen having a 3.2 mm thickness which was obtained by injection molding at 280° C., in accordance with the CIELAB method (Commission Internationale de 1' Eclairage 1976 L*a*b* Diagram). The yellowness of the specimen was expressed in terms of the b*-value. (3) Measurement of the elongation at break of a polycarbonate:

The elongation at break of a polycarbonate was measured, using a test specimen having a 3.2 mm thickness which was obtained by injection molding at 280° C., in accordance with ASTM D638.

(4) Measurement of the Izod impact strength of a polycarbonate:

The Izod impact strength (notched) of a polycarbonate was measured, using a test specimen having a 3.2 mm thickness which was obtained by injection molding at 280° C., in accordance with ASTM D256.

(5) Evaluation of the molding melt fluidity of a polycarbonate:

As a yardstick of the fluidity at a high shear rate, the HMI (which is a melt flow rate under a load of 21.6 kg) at 280° C. was measured in accordance with ASTM D1238.

(6) Determination of recurring unit (1), heterounit (A) and heterounit (B) in a polycarbonate:

55 mg of a polycarbonate was dissolved in 2 ml of tetrahydrofuran. To the resultant solution, 0.5 ml of 5 N solution of potassium hydroxide in methanol was added, and the solution was stirred at room temperature for 2 hours to completely hydrolyze the polycarbonate. The obtained mixture was mixed with 0.3 ml of concentrated hydrochloric acid and then, was subjected to reversed phase liquid chromatography.

The reversed phase liquid chromatography was performed, using a 991L UV detector (manufactured and sold by Waters Corporation, U.S.A) and Inertsil ODS-3 column (registered trade mark, manufactured and sold by GL Science Inc., Japan) at 25° C. A mixture of methanol and 0.1 weight % aqueous solution of phosphoric acid was used as an eluent, and measurement was carried out by gradient elution technique at a gradient such that the volume ratio [methanol/0.1 weight % aqueous solution of phosphoric acid] is changed from 20/80 at the start to 100/0.

The absorbance at 300 nm was measured using the UV detector. Absorbance coefficients for determining recurring unit (1), heterounit (A) and heterounit (B) were obtained by using standard compounds [as standard compounds, hydroxy compounds having structures formed by hydrolysis of recurring unit (1'), heterounit (2') and heterounit (3') were used].

EXAMPLE 1

A polycarbonate was produced by melt transesterification in accordance with a system as shown in FIG. 1. The system of FIG. 1 comprises first stage, second stage and third stage agitation polymerizations, and first stage, and second stage wire-wetting fall polymerizations.

The first stage agitation polymerization in first agitation type polymerizer vessels 3A and 3B (each having a capacity of 100 liters and equipped with an agitator having agitating blades of anchor type) was batchwise conducted, whereas the second stage and third stage agitation polymerizations in second and third agitation type polymerizer vessels 3C and 3D (each having a capacity of 50 liters and equipped with an agitator having agitating blades of anchor type) were continuously conducted.

The first stage and second stage wire-wetting fall polymerizations in first and second wire-wetting fall polymerizers 108A and 108B were continuously conducted. Each of the first and second wire-wetting fall polymerizers is equipped with a perforated plate which has 50 holes having a diameter of 7.5 mm and arranged in a zigzag configuration. In each of the first and second wire-wetting fall polymerizers, 50 strands of 1 mmϕ SUS 316 L wires are hung vertically from the respective holes of the perforated plate to a reservoir portion at the bottom of wire-wetting fall polymerizer 108 so that a polymerizable material will not fall freely (not free-fall) but fall along and in contact with the wires (wire-wetting fall). Illustratively stated, each wire 103 is secured at the upper end thereof to a support rod (not shown) provided above the perforated plate 102 and extends downwardly through a hole (not shown) of the perforated plate 102. In each of the first and second wire-wetting fall polymerizers, the wire-wetting fall distance is 8 m.

The polymerization reaction conditions in both of first agitation type polymerizer vessels 3A and 3B were as follows: the reaction temperature was 180° C., the reaction pressure was atmospheric pressure, and the flow rate of nitrogen gas was 1 liter/hr.

In operation, 80 kg of polymerizable materials [i.e., bisphenol A as an aromatic dihydroxy compound and diphenyl carbonate as a carbonic diester (the molar ratio of diphenyl carbonate to bisphenol A:1.04)] were charged together with a disodium salt of bisphenol A as a catalyst (the amount of the disodium salt of bisphenol A in terms of the amount of sodium atom: 25 ppb by weight, based on the weight of the bisphenol A as a polymerizable material) into first agitation type polymerizer vessel 3A. The monomer mixture in polymerizer 3A was polymerized in a molten state for 4 hours while agitating, to obtain prepolymer 4A. Outlet 5A was opened, and prepolymer 4A was fed to second agitation type polymerizer vessel 3C, having a capacity of 50 liters, at a flow rate of 5 kg/hr.

While feeding prepolymer 4A obtained in first agitation type polymerizer vessel 3A to second agitation type polymerizer vessel 3C, first agitation type polymerizer vessel 3B was operated to polymerize the monomer mixture of bisphenol A and diphenyl carbonate in the same manner as in the agitation polymerization in first agitation type polymerizer vessel 3A, to obtain prepolymer 4B.

When first agitation type polymerizer vessel 3A became empty, outlet 5A of polymerizer 3A was closed and, instead, outlet 5B of polymerizer 3B was opened, so that prepolymer 4B was fed from first agitation type polymerizer vessel 3B to second agitation type polymerizer vessel 3C at a flow rate of 5 kg/hr. In this instance, the same polymerizable materials and catalyst as mentioned above were charged into polymerizer 3A. While feeding prepolymer 4B obtained in first agitation type polymerizer vessel 3B to second agitation type polymerizer vessel 3C, polymerizer vessel 3A was operated, so that the monomer mixture charged therein was polymerized in the same manner as mentioned above.

With respect to a batchwise polymerization in first agitation type polymerizer vessels 3A and 3B and the alternate feedings of prepolymers 4A and 4B from polymerizers 3A and 3B to second agitation type polymerizer vessel 3C, the same operation as mentioned above was repeated, so that the prepolymer (either prepolymer 4A or prepolymer 4B, alternately) was continuously fed to second agitation type polymerizer vessel 3C.

In second agitation type polymerizer vessel 3C, a further agitation polymerization of prepolymers 4A and 4B, alternately fed from first agitation type polymerizer vessels 3A and 3B, was continuously carried out under polymerization reaction conditions wherein the reaction temperature was 230° C., the reaction pressure was 100 mmHg and the flow rate of nitrogen gas was 2 liters/hr, thereby obtaining prepolymer 4C.

When the volume of prepolymer 4C in second agitation type polymerizer vessel 3C reached 20 liters, a part of prepolymer 4C was continuously fed to third agitation type polymerizer vessel 3D so that the volume of prepolymer 4C in second agitation type polymerizer vessel 3C was constantly maintained at 20 liters.

In third agitation type polymerizer vessel 3D, a further agitation polymerization of prepolymer 4C fed from second agitation type polymerizer vessel 3C was continuously carried out under polymerization reaction conditions wherein the reaction temperature was 240° C., the reaction pressure was 10 mmHg and the flow rate of nitrogen gas was 2 liters/hr, thereby obtaining prepolymer 4D.

When the volume of prepolymer 4D in third agitation type polymerizer vessel 3D reached 20 liters, a part of prepolymer 4D was continuously fed to wirewetting fall polymerizer 108A so that the volume of prepolymer 4D in second agitation type polymerizer vessel 3D was constantly maintained at 20 liters. The feeding of prepolymer 4D to first wire-wetting fall polymerizer 108A was conducted through inlet 101A.

In first wire-wetting fall polymerizer 108A, a wire-wetting fall polymerization of prepolymer 4C was continuously carried out under polymerization reaction conditions wherein the reaction temperature was 245° C., and the reaction pressure was 1.5 mmHg and the flow rate of nitrogen gas was 4 liter/hr, thereby obtaining prepolymer 109A.

When the volume of prepolymer 109A at the bottom of first wire-wetting fall polymerizer 108A reached 10 liters, a part of prepolymer 109A was continuously fed to second wire-wetting fall polymerizer 108B so that the volume of prepolymer 109A in first wire-wetting fall polymerizer 108A was constantly maintained at 10 liters.

In second wire-wetting fall polymerizer 108B, a wire-wetting fall polymerization reaction was continuously carried out under polymerization reaction conditions wherein the reaction temperature was 245° C., and the reaction pressure was 0.3 mmHg and the flow rate of nitrogen gas was 2 liter/hr, thereby obtaining polycarbonate 109B.

When the volume of polycarbonate 109B at the bottom of second wire-wetting fall polymerizer 108B reached 10 liters, polycarbonate 109B was continuously withdrawn in the form of a strand from second wire-wetting fall polymerizer 108B through outlet 107B by means of discharge pump 106B so that the volume of polycarbonate 109B in second wire-wetting fall polymerizer 108B was constantly maintained at 10 liters. The obtained strand was cut into pellets by means of a strand cutter.

The temperature, the residence time and the value of (Ki×Ti×Hi) in each of the agitation type polymerizer vessels, in each of the wire-wetting fall polymerizers and in each of the conduits are shown in Table 1, together with the value of $$\sum_{i=1}^{n}(Ki \times Ti \times Hi).$$

(Ki×Ti×Hi). with respect to the obtained polycarbonate pellets, evaluation of various properties was made in accordance with the above-mentioned methods. Results are shown in Table 2. As can be seen from Table 2, the obtained polycarbonate had excellent properties.

Further, as a result of the measurement by reversed phase liquid chromatography, it was found that the obtained polycarbonate contained units of formula (2')-(a) as heterounit (A) and units of formula (3')-(d) as heterounit (B), wherein the units of formula (3')-(d) were present in an amount of 0.50 mole %, based on the molar amount of the units of formula (2')-(a), and wherein the sum of the amounts of the units of formula (2')-(a) and the units of formula (3')-(d) was 0.09 mole %, based on the molar amount of recurring units (1).

COMPARATIVE EXAMPLE 1

A polycarbonate was produced in substantially the same manner as in Example 1, except that the temperatures in some of the reaction zones were changed as shown in Table 3.

With respect to the obtained polycarbonate, evaluation of various properties was made in accordance with the above-mentioned methods. Results are shown in Table 2. As can be seen from Table 2, the obtained polycarbonate had excellent molding melt fluidity; however, the color, tensile elongation and Izod impact strength of the obtained polycarbonate were poor.

COMPARATIVE EXAMPLE 2

A polycarbonate was produced in substantially the same manner as in Example 1, except that a centrifugal wiped film evaporation type reactor and a horizontal twin-screw agitation type polymerizer were used instead of first wire-wetting fall polymerizer 108A and second wire-wetting fall polymerizer 108B, respectively, and that the reaction conditions were changed as shown in Table 4.

With respect to the obtained polycarbonate, evaluation of various properties was made in accordance with the above-mentioned methods. Results are shown in Table 2. As can be seen from Table 2, the obtained polycarbonate had excellent molding melt fluidity; however, the color, tensile elongation and Izod impact strength of the obtained polycarbonate were poor.

COMPARATIVE EXAMPLE 3

With respect to a commercially available phosgene process polycarbonate (the Mw of the polycarbonate: 26,800), evaluation of various properties was made in accordance with the above-mentioned method. Results are shown in Table 2. Although the poycarbonate used in this Comparative Example had the same Mw as that of the polycarbonate obtained in Example 1, the polycarbonate of this Comprarative Example had poor molding melt fluidity, as compared to the polycarbonate of Example 1.

EXAMPLE 2

A polycarbonate was produced in substantially the same manner as in Example 1, except that the reaction conditions were changed as shown in Table 5.

With respect to the obtained polycarbonate, evaluation of various properties was made in accordance with the above-mentioned methods. Results are shown in Table 2. As can be seen from Table 1, the obtained polycarbonate had excellent properties.

TABLE 1

[Reaction Conditions in Example 1]

| Reaction zones | Temperature (° C.) | Residence time (hr) | (ki × Ti × Hi) | $\sum_{i=1}^{n}(ki \times Ti \times Hi)$ in the process of Example 1 |
|---|---|---|---|---|
| First agitation type polymerizer vessels 3A, 3B | 180 | 20.0 | 0.261 | 0.83 |
| Conduit | 180 | 0.6 | 0.008 | |
| Second agitation type polymerizer vessel 3C | 230 | 7.2 | 0.135 | |
| Conduit | 230 | 0.2 | 0.004 | |
| Third agitation type polymerizer vessel 3D | 240 | 8.3 | 0.150 | |
| Conduit | 240 | 1.6 | 0.029 | |
| First wire-wetting fall polymerizer 108A | 245 | 4.3 | 0.117 | |
| Conduit | 245 | 0.1 | 0.003 | |
| Second wire-wetting fall polymerizer 108B | 245 | 4.4 | 0.119 | |
| Conduit | 245 | 0.2 | 0.005 | |

Note: In each of Tables 1, 3, 4 and 5, each "conduit" item between the polymerizer items shows the reaction conditions in a conduit between a polymerizer mentioned above the "conduit" item and a polymerizer mentioned below the "conduit" item, and the "conduit" item at the lowermost row shows the reaction conditions in a conduit between the last polymerizer (for a final product) and a withdrawal nozzle.

TABLE 2

| Evaluation items | Example 1 | Comparative Example 1 | Comparative Example 2 | Comparative Example 3 | Example 2 |
|---|---|---|---|---|---|
| Molar ratio (%) of the total of heterounits (A) and (B) to the total of recurring units (1) | 0.09 | 0.46 | 0.69 | 0.00 | 0.16 |
| Molar ratio (%) of heterounits (B) to heterounits (A) | 0.30 | 33.00 | 42.00 | — | 2.30 |
| Weight average molecular weight | 26,800 | 26,900 | 27,000 | 26,800 | 26,900 |

TABLE 2-continued

| Evaluation items | Example 1 | Comparative Example 1 | Comparative Example 2 | Comparative Example 3 | Example 2 |
|---|---|---|---|---|---|
| Molding melt fluidity, HMI (g/10 min) | 145 | 166 | 179 | 118 | 153 |
| Color (b* value) | 3.2 | 4.3 | 5.0 | 3.2 | 3.4 |
| Tensile elongation (%) | 107 | 78 | 69 | 107 | 102 |
| Izod impact strength (kg · cm/cm) | 98 | 83 | 81 | 98 | 96 |

TABLE 3

[Reaction Conditions in Comparative Example 1]

| Reaction zones | Temperature (° C.) | Residence time (hr) | (ki × Ti × Hi) | $\sum_{i=1}^{n}(ki \times Ti \times Hi)$ in the process of Comparative Example 1 |
|---|---|---|---|---|
| First agitation type polymerizer vessels 3A, 3B | 180 | 20.0 | 0.261 | 3.87 |
| Conduit | 180 | 0.6 | 0.008 | |

TABLE 3-continued

[Reaction Conditions in Comparative Example 1]

| Reaction zones | Temperature (° C.) | Residence time (hr) | (ki × Ti × Hi) | $\sum_{i=1}^{n}(ki \times Ti \times Hi)$ in the process of Comparative Example 1 |
|---|---|---|---|---|
| Second agitation type polymerizer vessel 3C | 230 | 7.2 | 0.135 | |
| Conduit | 230 | 0.2 | 0.004 | |
| Third agitation type polymerizer vessel 3D | 250 | 8.3 | 0.342 | |
| Conduit | 250 | 1.6 | 0.065 | |
| First wire-wetting fall polymerizer 108A | 260 | 4.3 | 0.378 | |
| Conduit | 260 | 0.1 | 0.009 | |
| Second wire-wetting fall polymerizer 108B | 270 | 4.4 | 2.547 | |
| Conduit | 270 | 0.2 | 0.117 | |

TABLE 4

[Reaction Conditions in Comparative Example 2]

| Reaction zones | Temperature (° C.) | Residence time (hr) | (ki × Ti × Hi) | $\sum_{i=1}^{n}(ki \times Ti \times Hi)$ in the process of Comparative Example 2 |
|---|---|---|---|---|
| First agitation type polymerizer vessels 3A, 3B | 140 | 20.0 | 0.180 | 15.52 |
| Conduit | 140 | 0.6 | 0.005 | |
| Second agitation type polymerizer vessel 3C | 210 | 7.2 | 0.118 | |
| Conduit | 210 | 0.2 | 0.004 | |
| Third agitation type polymerizer vessel 3D | 240 | 8.3 | 0.150 | |
| Conduit | 240 | 1.6 | 0.029 | |
| Centrifugal wiped film evaporation type reactor | 270 | 0.5 | 0.293 | |
| Conduit | 270 | 0.1 | 0.059 | |
| Horizontal twin-screw agitation type polymerizer | 290 | 0.5 | 10.490 | |
| Conduit | 290 | 0.2 | 4.196 | |

TABLE 5

[Reaction Conditions in Example 2]

| Reaction zones | Temperature (° C.) | Residence time (hr) | (ki × Ti × Hi) | $\sum_{i=1}^{n}(ki \times Ti \times Hi)$ in the process of Example 2 |
|---|---|---|---|---|
| First agitation type polymerizer vessels 3A, 3B | 140 | 20.0 | 0.180 | 0.97 |
| Conduit | 160 | 0.6 | 0.007 | |
| Second agitation type polymerizer | 210 | 3.6 | 0.059 | |

TABLE 5-continued

[Reaction Conditions in Example 2]

| Reaction zones | Temperature (° C.) | Residence time (hr) | (ki × Ti × Hi) | $\sum_{i=1}^{n}(ki \times Ti \times Hi)$ in the process of Example 2 |
|---|---|---|---|---|
| vessel 3C | | | | |
| Conduit | 210 | 0.2 | 0.004 | |
| Third agitation type polymerizer vessel 3D | 240 | 4.1 | 0.074 | |
| Conduit | 240 | 1.6 | 0.029 | |
| First wire-wetting fall polymerizer 108A | 245 | 2.2 | 0.060 | |
| Conduit | 250 | 0.1 | 0.004 | |
| Second wire-wetting fall polymerizer 108B | 265 | 2.2 | 0.505 | |
| Conduit | 265 | 0.2 | 0.046 | |

INDUSTRIAL APPLICABILITY

By virtue of the presence of specific heterounits in a specific amount in the polycarbonate main chains, the polycarbonate of the present invention is advantageous in that not only does it have high transparency and colorlessness as well as high mechanical strength, but also it can exhibit extremely high molding melt fluidity. Therefore, the polycarbonate of the present invention can be used in a wide variety of application fields.

We claim:

1. A polycarbonate comprising a plurality of aromatic polycarbonate main chains, each comprising recurring units each independently represented by the following formula (1):

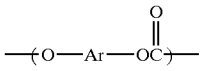

(1)

wherein Ar represents a divalent $C_5$–$C_{200}$ aromatic group, wherein [at least one of] said aromatic polycarbonate main chains [contains], *when considered together as a whole, contain therein* at least one heterounit (A) and at least one heterounit (B) [in said polycarbonate main chains], said heterounit (A) being represented by at least one formula selected from the group consisting of formulae of the following group (2):

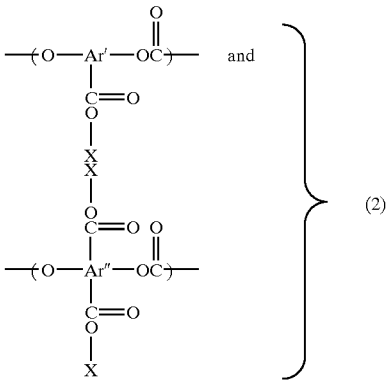

(2)

wherein Ar' represents a trivalent $C_5$–$C_{200}$ aromatic group, Ar" represents a tetravalent $C_5$–$C_{200}$ aromatic group, and X represents a polycarbonate chain having recurring units each represented by the formula

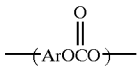

wherein Ar is as defined above and having a weight average molecular weight of from 214 to 100,000, and wherein, when said polycarbonate main chains contain a plurality of heterounits (A), the heterounits (A) are the same or different, said heterounit (B) being represented by at least one formula selected from the group consisting of formulae of the following group (3):

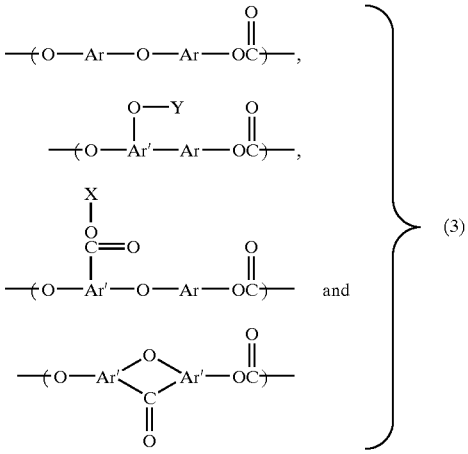

(3)

wherein Ar, Ar' and X are as defined above and Y represents a polycarbonate chain having recurring units each represented by the formula

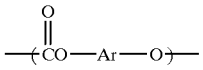

wherein Ar is as defined above and having a weight average molecular weight of from 214 to 100,000, and wherein, when said polycarbonate main chains contain a plurality of heterounits (B), the heterounits (B) are the same or different, the sum of the amounts of said heterounit (A) and said heterounit (B) being from 0.01 to 0.3 mole %, based on the molar amount of said recurring units (1), wherein each of said X and said Y optionally contains at least one heterounit selected from the group consisting of heterounits (A) and (B), said polycarbonate having a weight average molecular weight of from 5,000 to 300,000.

2. The polycarbonate according to claim 1, wherein 85% or more of said recurring units (1) are each represented by the following formula (1'):

(1')

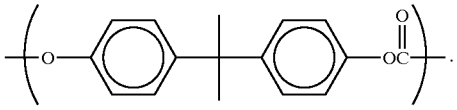

3. The polycarbonate according to claim 1, wherein:

said recurring units (1) are each represented by the following formula (1'):

(1')

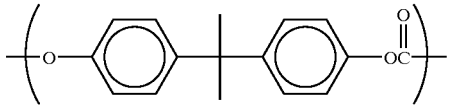

said heterounit (A) is represented by at least one formula selected from the group consisting of formulae of the following group (2'):

(2')

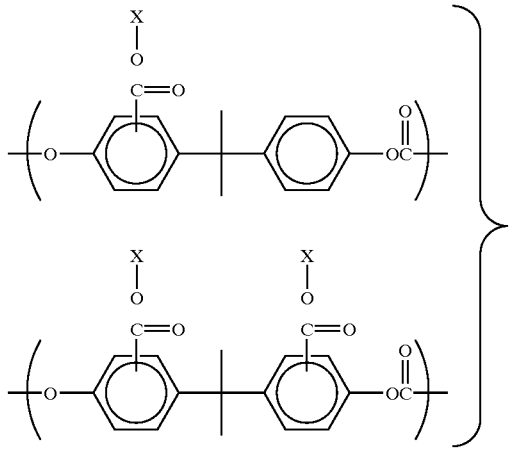

wherein X is as defined for formula (2), and said heterounit (B) is represented by at least one formula selected from the group consisting of formulae of the following group (3'):

(3')

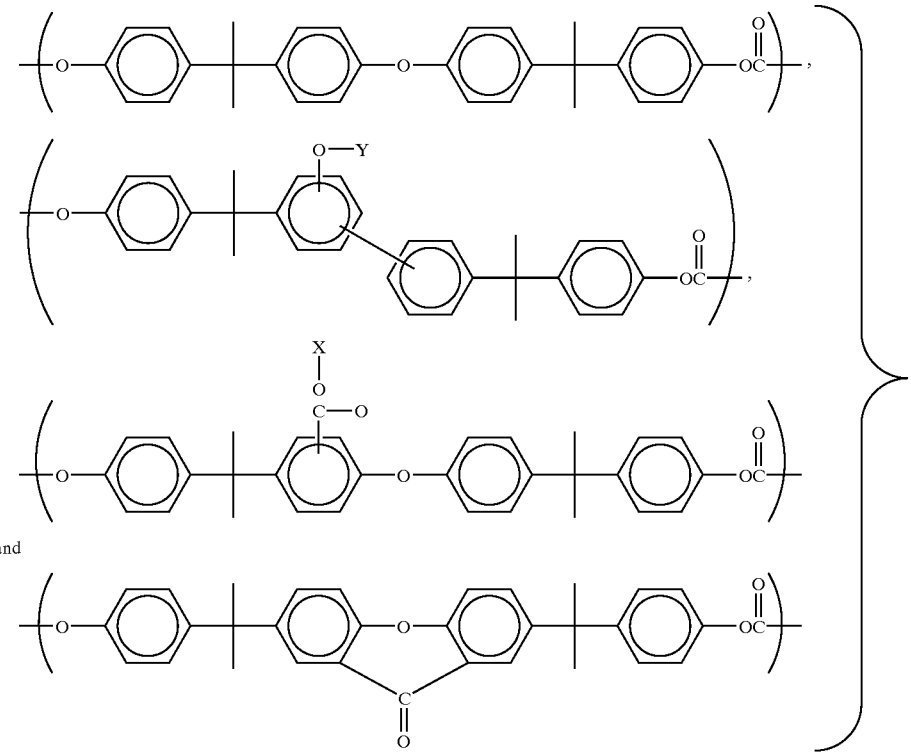

wherein X is as defined for formula (2), and

Y is as defined for formula (3).

4. The polycarbonate according to any one of claims 1 to 3, wherein said heterounit (B) is present in an amount of from 0.1 to 30 mole %, based on the molar amount of said heterounit (A).

5. The polycarbonate according to any one of claims 1 to 3, which is produced from an aromatic dihydroxy compound and a carbonic diester by transesterification.

6. In a method for producing a polycarbonate which comprises subjecting to a stepwise transesterification reaction, in a plurality of reaction zones, at least one polymerizable material selected from the group consisting of:

a molten monomer mixture of an aromatic dihydroxy compound and a carbonic diester, and a molten prepolymer obtained by a process comprising reacting an aromatic dihydroxy compound with a carbonic diester, said aromatic dihydroxy compound being represented by the following formula:

wherein Ar represents a divalent $C_5$–$C_{200}$ aromatic group, said carbonic diester being represented by the following formula:

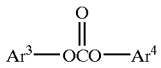

wherein $Ar^3$ and $Ar^4$ are the same or different and each represent a monovalent $C_5$–$C_{200}$ aromatic group, the improvement in which said stepwise transesterification reaction of the polymerizable material is performed under reaction conditions which satisfy the following formula (4):

$$0.2 \leq \sum_{i=1}^{n} (ki \times Ti \times Hi) \leq 1.2$$

wherein: i represents the zone number among n reaction zones of the reaction system, Ti represents the average temperature (°C.) of the polymerizable material in the i-th reaction zone, Hi represents the average residence time (hr) of the polymerizable material in the i-th reaction zone, ki represents a coefficient represented by the following formula (5):

$$ki = 1/(a \times Ti^{-b}) \quad (5)$$

wherein Ti is as defined above, and a and b depend on Ti, and wherein:

when Ti satisfies the formula:

$$Ti < 240°\ C.,$$

a is $1.60046 \times 10^5$ and b is 0.472, when Ti satisfies the formula:

$$240°\ C. \leqq Ti < 260°\ C.,$$

a is $4 \times 10^{49}$ and b is 19.107, and when Ti satisfies the formula:

$$260°\ C. \leqq Ti,$$

a is $1 \times 10^{122}$ and b is 49.082.

7. A polycarbonate which is the same product as produced by the method of claim 6.

* * * * *